No. 676,392. Patented June 11, 1901.
J. M. DOW.
PHOTOGRAPHIC NEGATIVE VIGNETTER.
(Application filed June 22, 1897.)
(No Model.) 2 Sheets—Sheet 1.
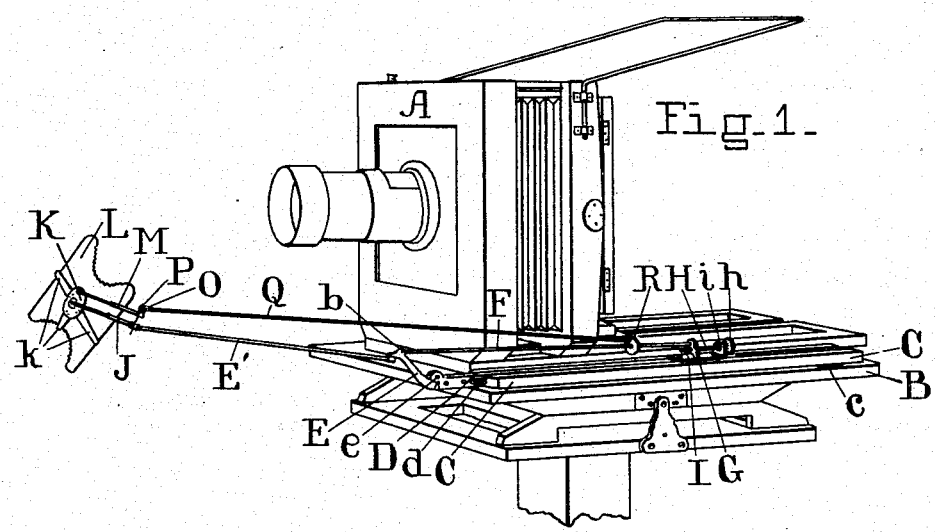
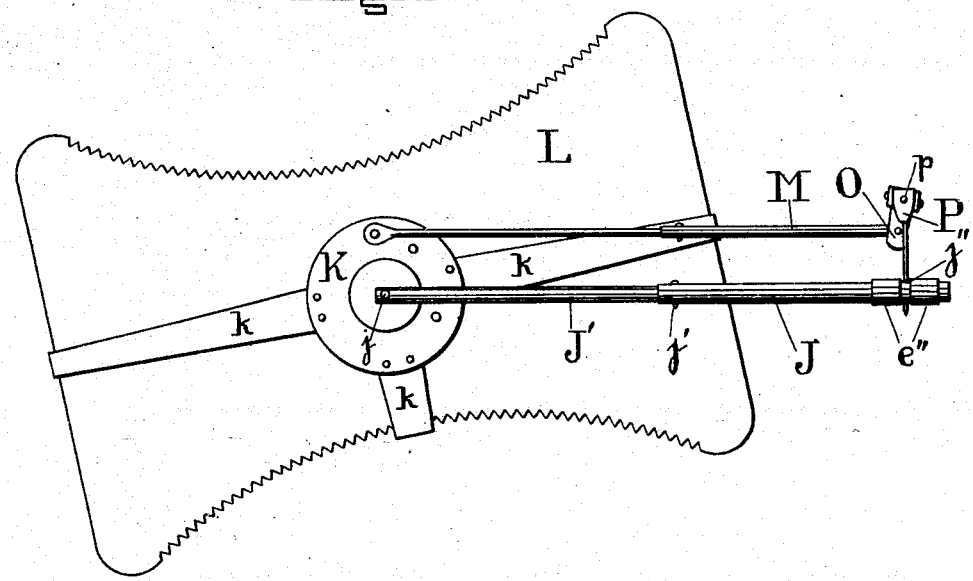
WITNESSES: George A. Chapman. William H. Tyrie.
INVENTOR James M. Dow
BY George C. Shepard
ATTORNEY

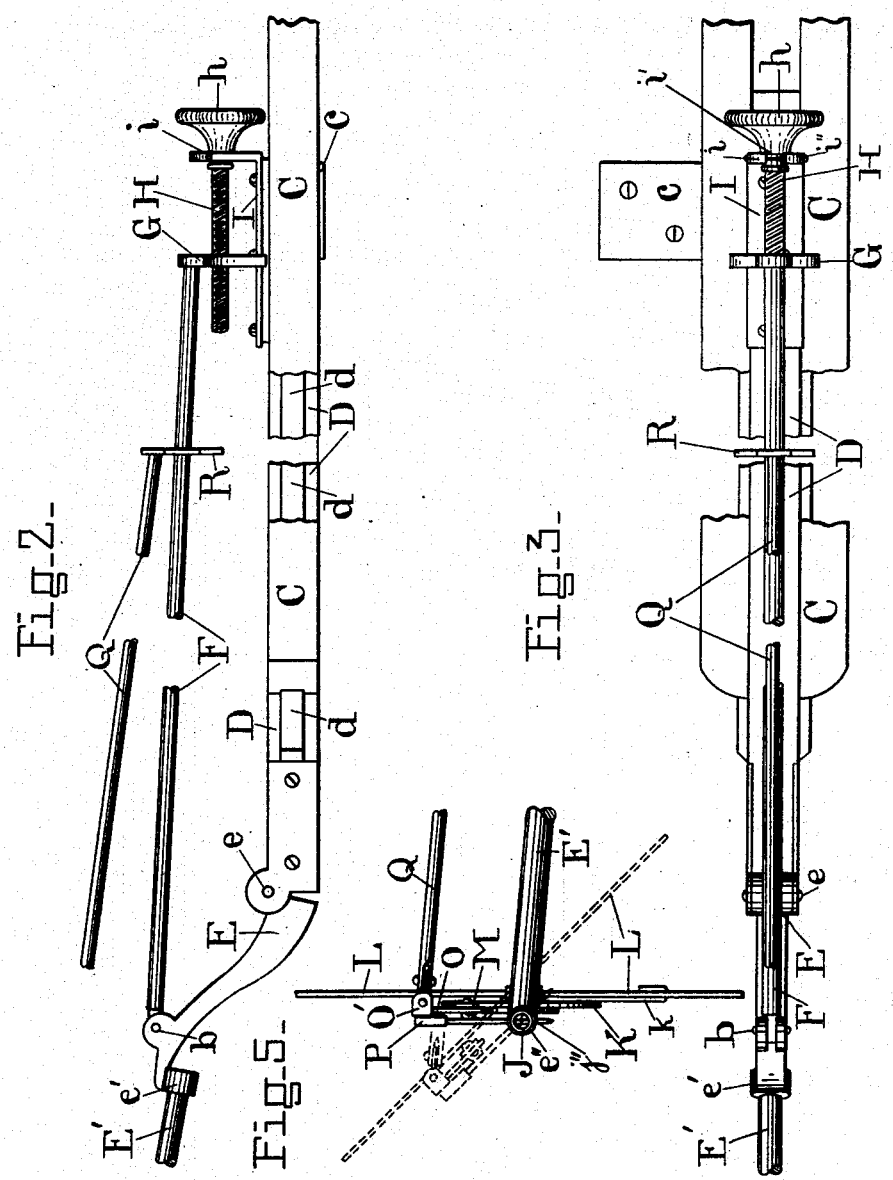

UNITED STATES PATENT OFFICE.

JAMES M. DOW, OF OGDENSBURG, NEW YORK.

PHOTOGRAPHIC-NEGATIVE VIGNETTER.

SPECIFICATION forming part of Letters Patent No. 676,392, dated June 11, 1901.

Application filed June 22, 1897. Serial No. 641,776. (No model.)

*To all whom it may concern:*

Be it known that I, JAMES M. DOW, a citizen of the United States of America, residing at Ogdensburg, in the county of St. Lawrence and State of New York, have invented certain new and useful Improvements in Negative-Vignetters; and I do hereby declare the following to be a full, clear, and exact description of the same, reference being had to the accompanying drawings, which form a part of this specification.

My invention relates to that class of vignetters adapted to be attached to the camera-frame, so as to move coincidently therewith and be manipulated by the operator while focusing, &c., without changing his position relative to the camera or removing the screen-cloth from his head; and the objects of my improvements are to provide an easily-manipulated vignetter that can be operated so as to retire the vignetting-card under the lens and out of the way when not in use, or extend it a reasonable distance in front of the same, or easily, quickly, and positively raise or lower it, or incline it forward or backward with relation to the camera, and also to partially rotate such card in the plane of its surface, so as to exclude from the field of the camera any part of the subject desired, and to so place it with relation to the light as to produce a negative with either an abrupt or a gradually-vanishing outline. These objects I attain by the means described herein and illustrated in the accompanying drawings, in which—

Figure 1 is a perspective view of my invention as applied to the bed-piece of an ordinary camera frame or stand. Fig. 2 is a side elevation, on an enlarged scale, of parts of my invention, showing more clearly the details of such parts. Fig. 3 is a plan view of the parts shown in Fig. 2. Fig. 4 is an enlarged front view of the vignetting-card with its rotatable holding-frame, bracket-arm, and rotating mechanism. Fig. 5 is a side view of the parts shown in Fig. 4.

Similar letters refer to similar parts throughout the several views.

A represents a photographic camera of the usual form, and B the bed-piece of its frame or stand, constructed in any of the usual forms; C, the ways, in which is slidingly secured the movable sill D by means of the tongue-and-groove joint L. To the forward end of this sliding sill D is secured the lever E by means of the hinge $e$, which allows the said lever to swing forward and back when attached by the connecting-rod F, hinged to said lever at $f$, as shown in Figs. 1, 2, and 3. This connecting-rod F is secured at its rear end to the guide-plate G, which is internally threaded to fit the thread of the thumb-screw H and at its lower end adapted to fit over and engage with the edges of the plate I, upon which it slides when moved forward or backward, as hereinafter explained. This plate I is rigidly attached to the rear end of the sliding sill D by screws or other suitable means and at its rear end is provided with the standard $i$, having a longitudinal slot $i'$, in which is journaled the shaft of the screw H, of which $h$ represents the knurled head. This shaft is held within its journal-seat by the pin $i''$, inserted in a transverse hole through said standard-post $i$.

I prefer to make the lever E in two parts in order to avoid weight and consequent straining and wear of the actuating devices by forming the rear part as above described and attaching thereto by any suitable means, such as a screw-thread and socket, as shown at $e'$, a forward part E', consisting of a hollow rod, on the forward end of which is formed a bifurcated transverse journal-box $e''$, adapted to receive the end of the rock-shaft J. This rock-shaft J, I prefer to make extensible by constructing it of two telescoping-tubes J and J', fastened in place by a retaining-pin $j'$, passed through holes drilled in said tubes, as plainly shown in Fig. 4, or other suitable means for the purpose of adjusting such rod in length to fit different widths of cameras employed. To the extended end of this rock-shaft at $j$ I pivot the card-holding frame K, having the extended arms $k\ k\ k$, hooked at their outer ends to removably support the vignetting-card L, which may be of any desirable shape and of different colors or shades on the different sides and be changed in position in said holder as desired. At any suitable point on said holding-frame above its pivotal joint $j$ I hinge thereto the reciprocating rotator-rod M, constructed with extensible joint in manner similar to that of rock-shaft J, above described, and to its outermost end I hinge the lower part of the oscillator O, the upper end of which I connect pivotally to the upper part of the post P by the pin $p$. This post at its lower end is inserted into the hole $j''$, drilled vertically through the rock-shaft J between the bifurcated journal-bearing $e''$, hereinbefore described. To the oscillator O, I attach by a universal joint O', back of its pivotal connection with the post P, the twisting-rod Q, which at its rear end I attach rigidly to one side of the sliding collar R, which is mounted slidingly and rotatively on the rod F, hereinbefore described. I prefer to make this collar R of such shape as to be readily grasped by the fingers for actuation, as hereinafter explained.

My said vignetting apparatus is attached to the bed-piece of an ordinary camera frame or stand by means of the lugs $c$, attached to both the said bed-piece and the said ways C by screws or other means usually employed for such purpose.

To operate my said negative-vignetter, (the same being first attached to the bed-piece of the camera-frame, as above explained, and the shafts J and rod M adjusted in length so that the center of the holder K shall come in line with the sight of the camera,) I grasp the finger-piece $h$ of the thumb-screw H, and thereby slide the sill-piece and its connected mechanism to such position as I find best adapted to the size of the required picture. I then raise or lower the vignetting-card by turning said thumb-screw, so as to project or retract the rod F, thereby raising or lowering the lever E and its connected rock-shaft J and holder K. I then grasp the collar R with the fingers of the left hand, and by sliding it forward or backward on the rod F, I rotate the shaft J in its bearings $e''$, and with it the holder K. At the same time by rotating said collar R on the rod F, I actuate the twisting-rod Q and connected oscillator O and the rod M, so as to rotate the card L on the pivot $j$ and in the plane of its surface to any desired position. When once placed in any position the friction of the parts described will hold it in such position until again adjusted in the manner explained.

It is apparent that when once adjusted in position the holder K, with the vignetting-card L, may be rotated in the plane of its surface without otherwise disturbing its position relative to the focal axis of the lens and the light and shade of the operating-room, as would be the case were the card rocked or oscillated upon an axis outside the plane of its surface or remote from the focal axis of the lens. It is also apparent that my improved vignetter can be easily operated from a position behind the camera by the left hand of the operator, while his right is used to adjust the lens or in other work, so that with the wide scope of adjustment of which it is capable the most delicate effects of light may be obtained. It is also apparent that with it the ordinary funnel may be employed on the lens-tube or not, as desired, and, if so desired, the vignetting-card may be retired entirely out of sight of the camera below the lens-tube. It will be also apparent that the vignetting-card may be instantaneously exchanged for another when desired without interfering with the adjustment of the apparatus and that as the camera is raised, lowered, inclined, or shifted the vignetting apparatus will follow all its movements without any part thereof being in the way of the operator. It is also apparent that mechanical modifications of form will readily suggest themselves to those familiar with the art to accomplish the same movements. I therefore do not limit my claims to the exact form shown; but What I do claim as my invention, and desire to secure by Letters Patent, is—

1. A negative-vignetter, comprising ways adapted to be removably attached to the camera-frame, a sill-piece held slidingly on said ways and carrying at its forward end a lever hinged thereto, a laterally-projecting extensible arm journaled in the forward end of said lever, a card-holding frame pivotally hung to said arm, a thumb-screw revolubly attached to the rear end of said sill-piece, a sliding nut engaging said thumb-screw and a rod connecting said lever and said nut, a rotatable collar sliding on said rod, and a secondary rod at one end attached rigidly to said collar and at the other end hinged to a transversely-swinging lever supported on said arm, and connected with said card-holding frame by an extensible rod so as to rotate said frame.

2. A negative-vignetter, comprising ways and having means for attaching the same to a camera frame or stand; a sill-piece slidingly held by said ways and carrying at or near its forward end a lever hinged thereto, with means for positively operating and holding said lever in position; a laterally-projecting extensible arm journaled in the forward end of said lever and means for rotating said arm in such journal; a card-holding frame pivotally hung to said arm and means for rotating said frame on such pivotal hanging.

3. A negative-vignetter, comprising ways and having means for attaching the same to a camera frame or stand; a sill-piece slidingly held by said ways and carrying at or near its forward end a lever hinged thereto, with means for positively operating and holding said lever in position; a laterally-projecting arm journaled in the forward end of said lever, and means for rotating said arm in such journal, a card-holding frame pivotally hung to said arm and means for rotating said frame on such pivotal hanging.

4. A vignetting apparatus, comprising a vignetting-card, a support for said card extending to a point about opposite the center of the said card and outside the plane of the card, and means for rocking the said card on the end of said support, substantially as described.

5. A vignetting apparatus, comprising a vignetting-card, a support for the same extending to the rear of the center of the card, and outside the plane thereof, and means for rocking said support to vary the inclination of the card with respect to the lens of the camera without changing the distance of the card as a whole from said lens, substantially as described.

6. A vignetting apparatus, comprising a vignetting-card, a rock-shaft extending to a point opposite the central portion of the card and in a plane to one side of the plane of the said card for pivotally supporting the same, means for rocking said shaft to tilt the card, and means for raising and lowering said rock-shaft to vary the height of the card, substantially as described.

7. A vignetting apparatus, comprising a card having one or more vignetting edges, a rock-shaft extending to the middle thereof and outside its plane for supporting it, means for rocking said shaft, means for pivotally supporting said card on the end of said shaft, and means for operating the same, whereby the card may be turned in the plane of its surface, substantially as described.

8. In a vignetting apparatus, the combination with a vignetting-card, of a frame for supporting the same, a support extending to the said frame for pivotally supporting it at a point about opposite the center of the card and in a plane outside the plane of the said card, and means for rocking the said frame on its pivot-point for turning the card in the plane of its surface, substantially as described.

9. In a vignetting apparatus, the combination with a vignetting-card, of a frame for supporting the same, comprising a disk, arms carried thereby for engaging the edges of the card, a support for pivotally supporting said disk, a rod pivotally attached to said disk, and means for moving the rod back and forth to rock the disk and frame on said support to vary the position of the card, substantially as described.

10. In a vignetting apparatus, the combination with a vignetting-card, of a frame for holding the same, a rock-shaft, pivotally supporting said frame, an arm on said shaft, and an operating-rod connected with said arm for rocking the shaft and card, substantially as described.

11. In a vignetting apparatus, the combination with a vignetting-card, of a pivoted frame for holding the same, a rock-shaft pivotally supporting at one end the said frame, and having an actuating-arm at its other end, a lever or oscillator pivoted to said arm, a rod connecting the oscillator with the card-frame, an operating-rod connected with the arm on the rock-shaft and the oscillator, whereby the card may be tipped forward or backward or may be turned in the plane of its surface, substantially as described.

12. In a vignetting apparatus, the combination with a vignetting-card, of an oscillating frame for holding the same, a rock-shaft pivotally supporting said frame, a lever-arm having a bearing for supporting said rock-shaft, an arm on said rock-shaft, an oscillator folded over the said arm and pivoted thereto, a rod connecting the oscillator with the frame, a twist or operating rod connected with the arm and oscillator, a universal joint connecting the said rod with the arm and oscillator, and a head on said twist-rod for actuating it, substantially as described.

13. In a vignetting apparatus, the combination with a card, of means for pivotally supporting the same, a lever carrying said means, and a screw or worm connected with said lever for positively controlling its position, substantially as described.

14. In a vignetting apparatus, the combination with a pivoted lever for supporting a vignetting-card, of a rod for operating the same, a plate secured to the said rod, a guide for directing the movement of said plate, a screw engaging a screw-threaded aperture in said plate, and a milled head for turning said screw to raise and lower the lever and the card, substantially as described.

15. In a vignetting apparatus, the combination with a vignetting-card, of a pivoted frame for holding the same, a rock-shaft supporting said frame, a rod for oscillating the frame on said rock-shaft, a twist and push rod connected with the rock-shaft and the frame-rod, a pivoted lever supporting said rock-shaft, a rod for raising and lowering the same, and an operating plate or collar secured to said twist-rod and sliding on the lever-controlling rod, substantially as described.

16. In a vignetter, the combination with a card-frame, of an extensible rock-shaft for supporting the same, an extensible rod for rocking said frame, a lever supporting said mechanism, a slide for pivotally supporting said lever, and a screw mechanism for regulating the height of said lever, substantially as described.

JAMES M. DOW.

Witnesses:
EDWARD P. LYNCH,
GEORGE B. SHEPARD.